Sept. 17, 1940.    A. U. WELCH, JR    2,214,868
CONTROL SYSTEM
Filed May 9, 1939

Inventor:
Alanson U. Welch, Jr.,
by Harry E. Dunham
His Attorney.

Patented Sept. 17, 1940

2,214,868

UNITED STATES PATENT OFFICE 2,214,868

CONTROL SYSTEM

Alanson U. Welch, Jr., Pittsfield, Mass., assignor to General Electric Company, a corporation of New York Application May 9, 1939, Serial No. 272,633

5 Claims. (Cl. 171—119)

My invention relates to electric control systems.

It is an object of my invention to provide an automatic voltage reduction and short-circuit control by means of which the secondary voltage of a power transformer is reduced a predetermined time interval after open or short-circuit conditions have been established.

It is a further object of my invention to provide a system in which a power transformer and a control transformer are provided with primaries having winding sections connected to terminal studs which may be interconnected for different supply voltages without imposing destructive duty requirements on the control transformer as a result of unbalanced conditions in the power transformer resulting from its construction or the manner in which its connection with a source of supply is controlled.

Other objects of my invention will become apparent from the following description thereof.

Figure 1:
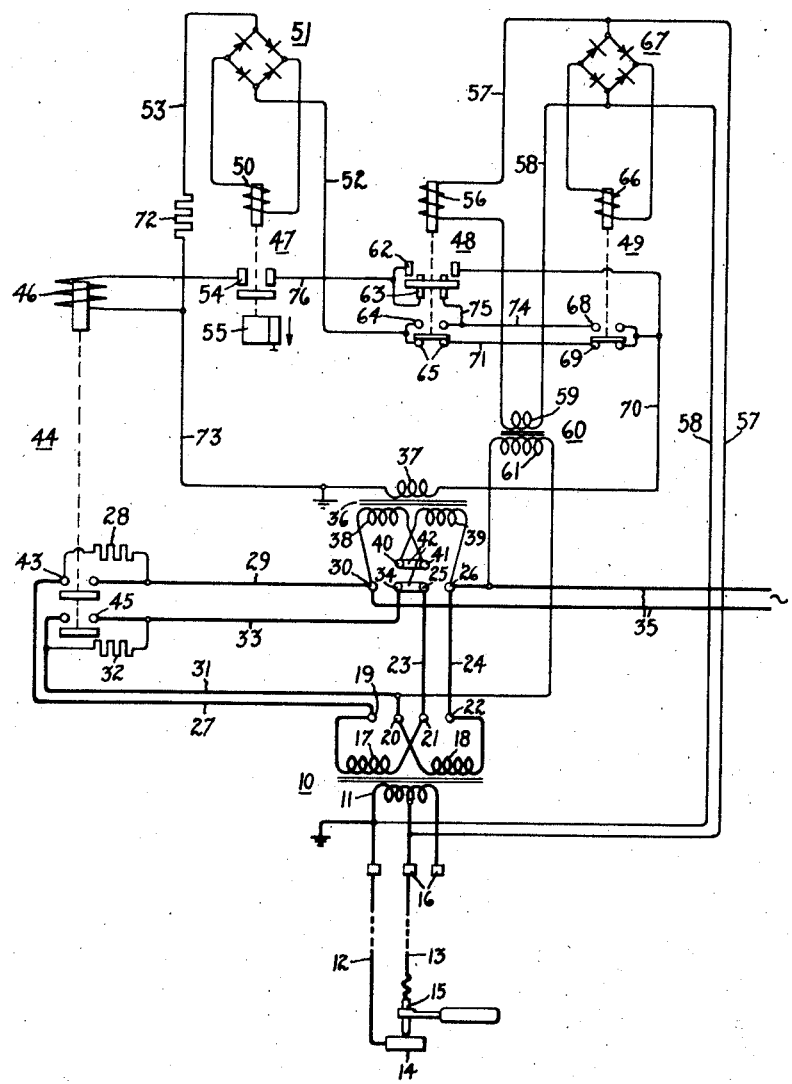
Figures 2, 3:
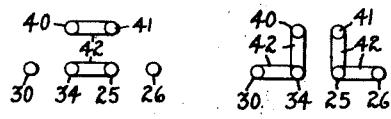

In the accompanying drawing, Fig. 1 diagrammatically represents a control system embodying my invention, and Figs. 2 and 3 show the interconnection of the terminal studs of Fig. 1 for different values of supply voltage.

In Fig. 1, my invention has been illustrated as applied to an automatic voltage reducing control for arc welding transformers. The control illustrated reduced automatically the voltage applied to the welding leads a short time after welding ceases and also has the function of not reimpressing full voltage on the welding leads until the operator has short-circuited his electrode and then opened this short-circuit. This control consequently prohibits an appreciable flow of current when the electrode first engages the work. It also functions to reduce the welding current to a negligible value if the welder short-circuits his electrode and maintains that short-circuit for a predetermined time interval. In other words, the control illustrated will permit neither a continuing open circuit with full voltage nor a continuing short-circuit with full current but will maintain full current only when an arc is actually being held.

In Fig. 1, the reference numeral 10 designates a welding transformer having a secondary winding 11 which is connected to energize a load circuit comprising conductors 12 and 13. The conductor 12 may be connected to the work 14 and the conductor 13 may be connected to an arc welding electrode or an electrode holder 15. In order to change the voltage which may be supplied to the load circuit the secondary winding of the transformer 10 is provided with taps 16.

The primary winding of the welding transformer is provided with two sections 17 and 18 to adapt it for connection to sources of supply of different voltages. The windings 17 and 18 are connected to terminals 19, 20, 21 and 22. Terminals 21 and 22 are connected through conductors 23 and 24 to connection studs 25 and 26. Terminal 19 is connected through conductor 27, resistance 28 and conductor 29 to connection stud 30 and terminal 20 is connected through conductor 31, resistance 32 and conductor 33 to connection stud 34. Connection studs 26 and 30 are connected through conductor 35 to a source of alternating current supply.

A source of control voltage is provided by an auxiliary transformer 36 having a secondary winding 37 and a primary winding comprising sections 38 and 39. The terminals of the sections 38 and 39 of the primary winding are connected to terminal studs 30, 40, 41 and 26 as illustrated in the drawing.

Links 42 are provided for connecting the terminal studs 25, 26, 30, 34, 40 and 41 as illustrated in Fig. 3 for a low voltage connection and as illustrated in Figs. 1 and 2 for a voltage twice the amount of the low voltage connection. It is to be noted that for the low voltage connection the sections of the primary windings of the transformer are connected in parallel with terminals of like polarity connected together and that for the high voltage connection the sections of the primary windings of the transformers are connected in series with terminals of unlike polarity being connected together independently of one another in both the main and auxiliary transformer. Such a connection means prevents the circulation of destructive currents in the sections of the primary winding of the auxiliary transformer on the series connection which may result from the switching operations described below by which resistances 28 and 32 are short-circuited or from unbalanced conditions in the primary winding of the welding transformer.

Resistances 28 and 32 above referred to are matched to the transformer exciting current in such a manner that the secondary voltage of the welding transformer normally about 80 volts, is reduced to a voltage between 25 and 30 when the transformer is not loaded. These resistances, constituting a voltage reducing means, are arranged in circuits extending between the connection studs and terminals of the primary winding sections of the welding transformer 10 so as to be equally effective for either the series or parallel connection of these winding sections.

Resistance 28 is adapted to be short-circuited by contacts 43 of an electromagnetic switch 44 and resistance 32 is likewise adapted to be short-circuited by contacts 45 of the same electromagnetic switch. This electromagnetic switch is provided with an operating winding 46 which is adapted to be energized by the secondary 37 of the auxiliary transformer 36 through a control circuit embodying relays 47, 48 and 49.

Relay 47 is provided with an operating winding 50 which is connected across the direct current terminals of a rectifier 51 whose alternating current terminals are connected to conductors 52 and 53. This relay when energized closes its contacts 54 and when deenergized opens these contacts after a predetermined time interval determined by a time delay means such as a dashpot 55.

Relay 48 is provided with an operating coil 56 which is connected across the load circuit through conductors 57, 58 and the secondary 59 of a transformer 60. The primary 61 of this transformer is connected in parallel with the section 18 of the primary of the welding transformer 10 in such a manner that the voltage of its secondary winding 59 opposes and is substantially equal to the secondary voltage of the welding transformer 10 except when transformer 10 is supplying load or short-circuit current. By reason of this connection, the relay 48 operates in response to the impedance drop in the welding transformer 10. As is usual the transformer 10 has a drooping voltage characteristic and the transformer 60 is chosen to have a substantially constant voltage characteristic so that during welding and upon short-circuit the differences in the secondary voltages of the welding transformer 10 and the transformer 60 are sufficient to operate the relay 48. Relay 49 is provided with control contacts 62, 63, 64 and 65. As illustrated in the drawing, the contacts 62 and 63 overlap so that the bridging member of this relay transfers circuits through these contacts without deenergizing one before energizing the other.

The relay 49 has an operating winding 66 which is connected across the direct current terminals of a rectifier 67 whose alternating current terminals are connected through conductors 57 and 58 across the load circuit conductors 12, 13. Relay 49 is a voltage relay and when energized by open circuit voltage of normal or reduced value or normal load voltage closes its contacts 68 and when substantially de-energized by reason of a short-circuit on the load conductors 12, 13 closes its contacts 69.

The organization of the control circuit will be further described in connection with its operation.

Electromagnetic switch 44 and relays 47, 48 and 49 are shown in the positions they assume before conductors 35 are connected to the source of supply. When these conductors are connected to the source of supply and electrode 15 is not in engagement with the work 14, a reduced open circuit voltage will appear between the electrode and the work, due to the energization of the welding transformer 10 through resistances 28 and 32, and full control voltage will be available across the secondary winding 37 of auxiliary transformer 36. Relay 49 will be energized opening its contacts 69, and relay 48 will remain in the position illustrated since the secondary voltage of transformer 60 will balance the open circuit voltage of the secondary of the welding transformer 10. This interrupts the energizing circuit for the winding 50 of relay 47 through conductors 70, 71 or 74, 52, a voltage reducing resistance 72 and conductor 73 from the secondary 37 of transformer 36.

When, however, the operator touches the electrode 15 to the work 14, relay 49 will open its contacts 68 and close its contacts 69. Relay 48 will still maintain the connection through its contact 65 because the voltage on the welding transformer 10 as well as on transformer 60 collapses appearing across the resistances 28 and 32. Relay 50 will, consequently, be energized from one terminal of the secondary 37 of the auxiliary transformer 36 through conductor 70, contacts 69 of relay 49, conductor 71, contacts 65 of relay 48, conductor 52, rectifier 51, conductor 53, resistance 72, and conductor 73 to the other terminal of the secondary 37 of the auxiliary transformer 36. Relay 47 will, consequently, close its contacts 54.

As soon as the operator withdraws electrode 15 from the work 14, relay 49 will close its contact 68 and complete the energizing circuit of coil 46 of the electromagnetic switch 44 from one terminal of the secondary 37 of transformer 36 through conductor 70, contacts 68 of relay 49, conductors 74 and 75, contacts 63 of relay 48, conductor 76, contacts 54 of relay 47, operating winding 46 of electromagnetic switch 44 and conductor 73 to the other terminal of the secondary 37 of the auxiliary transformer 36. The switch 44 will, consequently, close its contacts 43 and 45, short-circuiting the resistances 28 and 32 thus applying full voltage to the welding transformer 10 which will supply full open circuit voltage to the load circuit 12, 13. This circuit will be maintained for a short interval of time (for example, two seconds) while the contacts 54 of relay 47 remain closed, it being noted that when relay 49 opened its contacts 69 the energizing circuit for the operating coil 50 of relay 47 was interrupted at these contacts. If the operator begins welding within the period of time delay established by the relay 47, relay 49 will maintain closed its contacts 68 and relay 48 will close its contacts 64 and transfer the circuit through its contacts 63 to its contacts 62. As previously pointed out, relay 48 operates on the difference between the secondary voltages of the welding transformer 10 and the transformer 60 and under operating conditions there is a substantial impedance drop in the welding transformer 10 due to its drooping voltage characteristic. So long as the welding operation is maintained relay 47 is energized by the transformer 36 through circuits previously traced and including contacts 64 of relay 48 and contacts 68 of relay 49 and the electromagnetic switch 44 is maintained energized by reason of the connection of its operating coil 46 across the secondary 37 of the auxiliary transformer 36 through contacts 54 of relay 47 and contacts 62 of relay 48.

If the operator discontinues his welding operation and maintains the load circuit 12, 13 open, relay 48 will be deenergized opening its contacts 64 and relay 49 will be energized closing its contacts 68. This will deenergize relay 47 which after a predetermined time interval will open its contacts 54 deenergizing electromagnetic switch 44 which by opening its contacts 43 and 45 reduces the secondary voltage of the welding transformer and consequently the voltage of the load circuit 12, 13 through the agency of resistances 28 and 32 which are then connected between the source of supply and the primary of the welding transformer.

If the operator short-circuits the load circuit 12, 13 by laying his electrode or holder 15 on the work 14, relay 49 will be deenergized sufficiently so that it will open its contacts 68 thereby interrupting the energizing circuit for the operating winding 50 of relay 47. This relay will after a short interval of time, open its contacts 54 and thereby deenergize the operating winding 46 of electromagnetic switch 44. This switch will then open its contacts 43 and 45 and by inserting resistances 28 and 32 reduce the primary voltage of the welding transformer 10 to a low value so that the short-circuit current flowing in the conductors 12, 13 will be reduced to a few amperes.

It will thus be seen that this control will permit neither an open circuit with full voltage nor a short-circuit with full current but will maintain full load current only when an arc is established. It thus protects an operator against shock from open circuit voltage and at the same time protects the welding transformer and welding leads from overheating due to accidental short-circuit.

It is to be noted that the particular control just described has the advantage of "failing safe" since failure of any relay to pick up will necessarily result in reduced voltage on the load circuit.

The system above described may be variously modified without departing from the spirit and scope of my invention. For example, relays of different constructions controlling connections differently arranged may be used instead of those illustrated. I aim, consequently, to cover by the appended claims all those modifications which fall within the true spirit and scope of my invention.

What I claim as new and desire to secure by Letters Patent of the United States is:

1. An electric system comprising a source of alternating current, a transformer having primary and secondary windings, a load circuit connected to the secondary winding of said transformer, means for reducing the voltage supplied from said source to the primary winding of said transformer, and means for connecting independently of said voltage reducing means the primary winding of said transformer to said source of alternating current for a predetermined time interval upon the closing and subsequent opening of said load circuit, for maintaining said connection under normal load conditions and for interrupting said connection a predetermined time after said load circuit has been short-circuited, said means including a relay responsive to the voltage of said load circuit, a relay responsive to a difference in the voltages across the primary and secondary windings of said transformer, and circuits controlled by the operation of said relays.

2. An electric system comprising a source of alternating current, a transformer having primary and secondary windings, a load circuit connected to the secondary winding of said transformer, an electromagnetic switch having an operating winding and contacts for controlling the connection of the primary winding of said transformer to said source of supply, a time delay relay having an operating winding and contacts for controlling the energization of the operating winding of said electromagnetic switch, a voltage relay having an operating winding connected across said load circuit and contacts in one circuit for controlling the energization of the operating winding of said time delay relay and contacts in another circuit for controlling the energization of the operating winding of said electromagnetic switch, and a relay having an operating winding connected to be responsive to the impedance drop in said transformer upon the flow of a load current or short-circuit current in excess of load current and contacts connected in series circuit with the contacts of said voltage relay for controlling the energization of the operating winding of said time delay relay and additional contacts for transferring the energizing circuit for the operating winding of said electromagnetic switch from the circuit including the contacts of said voltage relay.

3. An electric system comprising a source of alternating current, a drooping voltage characteristic power transformer having primary and secondary windings, a load circuit connected to the secondary windings of said transformer, means connected in circuit between said source of alternating current and the primary winding of said transformer for reducing the voltage of the secondary winding of said transformer, an electromagnetic switch having an operating winding and contacts for connecting the primary winding of said power transformer to said source of alternating current independently of said voltage reducing means, a time delay having an operating winding and contacts for controlling the energization of the operating winding of said electromagnetic switch, a voltage relay having an operating winding connected across said load circuit and contacts in one circuit for controlling the energization of the operating winding of said time delay relay and contacts in another circuit for controlling the energization of the operating winding of said electromagnetic switch, a relay having an operating winding and contacts connected in series circuit with the contacts of said voltage relay for controlling the energization of the operating winding of said time delay relay and additional contacts for transferring the energizing circuit for the operating winding of said electromagnetic switch from the circuit including the contacts of said voltage relay, and a substantially constant potential auxiliary transformer having its primary winding connected across the primary winding of said power transformer and its secondary winding connected differentially with the secondary winding of said power transformer in series circuit with the operating winding of said last-mentioned relay.

4. An electric system comprising a source of alternating current, a drooping voltage characteristic power transformer having primary and secondary windings, a load circuit connected to the secondary windings of said transformer, means connected in circuit between said source of alternating current and the primary winding of said transformer for reducing the voltage of the secondary winding of said transformer, an electromagnetic switch having an operating winding and contacts for connecting the primary winding of said power transformer to said source of alternating current independently of said voltage reducing means, a relay having an operating winding and contacts completing in one position the energizing circuit for the operating winding of said electromagnetic switch and movable after a predetermined time delay to another position in which said contacts interrupt the energizing circuit of the operating winding of said electromagnetic switch, a second relay having an operating winding connected across said load circuit and movable to one position in response to short-circuit voltage and to another position in response to open circuit and normal load voltage, said relay having contacts which on said one position complete a circuit for controlling the energization of the operating winding of said time delay relay and additional contacts which in said other position complete another circuit for controlling the energization of the operating winding of said electromagnetic switch, a third relay having an operating winding and movable from one position to another position and having contacts which complete in either position a circuit through the contacts of said second relay for controlling the energization of the operating winding of said time delay relay and having additional contacts for transferring in its second position the energizing circuit for the operating winding of said electromagnetic switch from the circuit including the contacts of said second relay which are completed when said second relay is in its second position, and a substantially constant potential auxiliary transformer having its primary winding connected across the primary winding of said power transformer and its secondary winding connected differentially with the secondary winding of said power transformer in series circuit with the operating winding of said last-mentioned relay.

5. An electric system comprising a source of alternating current, a main transformer having a secondary winding and a primary winding comprising two sections, switching means individual to and interposed between each of the sections of said primary winding and said source of alternating current for controlling the connection therebetween, means for controlling the functioning of said switch means, said means including an auxiliary control transformer having a primary winding comprising two sections, and means for connecting said sections of said main transformer and said auxiliary transformer in series or parallel circuit relation depending upon the voltage of said source, terminals of like polarity of said sections being connected together for the parallel circuit relation and terminals of unlike polarity of said sections of said main transformer and of said auxiliary transformer being connected together independently of one another for the series circuit relation.

ALANSON U. WELCH, Jr.